United States Patent [19]

Broussoux et al.

[11] Patent Number: 5,267,076
[45] Date of Patent: Nov. 30, 1993

[54] PROCESS FOR OBTAINING A STRUCTURE GENERATING NON-LINEAR ELECTROOPTICAL EFFECTS, STRUCTURE OBTAINED AND APPLICATIONS THEREOF

[75] Inventors: Dominique Broussoux, Marcoussis; Jean-Claude Dubois, St Remy les Chevreuses; Pierre Le Barny, Orsay; Philippe Robin, Bourg la Reine, all of France

[73] Assignee: Thomson-CSF, Puteaux, France

[21] Appl. No.: 460,970

[22] PCT Filed: Jun. 6, 1989

[86] PCT No.: PCT/FR89/00283
§ 371 Date: Feb. 8, 1990
§ 102(e) Date: Feb. 8, 1990

[87] PCT Pub. No.: WO89/12248
PCT Pub. Date: Dec. 14, 1989

[30] Foreign Application Priority Data

Jun. 10, 1988 [FR] France ................ 88 07764

[51] Int. Cl.$^5$ ............................................. G02F 1/01
[52] U.S. Cl. ................................. 359/245; 307/400; 385/123
[58] Field of Search ............. 350/353, 355, 96.11, 350/96.12, 96.29, 96.30; 307/400; 252/62.2; 359/245, 246; 385/14, 123, 130, 132

[56] References Cited

U.S. PATENT DOCUMENTS

| | | | |
|---|---|---|---|
| 3,665,206 | 5/1972 | Bergman et al. | 307/88.3 |
| 3,858,307 | 1/1975 | Yoshimura et al. | 307/400 |
| 4,025,165 | 5/1977 | Sollish et al. | 350/358 |
| 4,250,415 | 2/1981 | Lewiner et al. | 307/400 |
| 4,307,937 | 12/1981 | Gordon | 350/96.29 |
| 4,403,834 | 9/1983 | Kley | 350/358 |
| 4,513,049 | 4/1985 | Yamasaki et al. | 307/400 |
| 4,591,465 | 5/1986 | Miyata et al. | 264/24 |
| 4,659,177 | 4/1987 | Choe et al. | 350/96.34 |
| 4,749,348 | 6/1988 | Klaase et al. | 307/400 |
| 4,844,577 | 7/1989 | Ninnis et al. | 350/96.29 |
| 5,061,760 | 10/1991 | East et al. | 264/22 |

FOREIGN PATENT DOCUMENTS

| | | |
|---|---|---|
| 0021967 | 1/1981 | European Pat. Off. . |
| 0214818 | 3/1987 | European Pat. Off. . |
| 2597109 | 10/1987 | France . |
| 0137168 | 8/1979 | German Democratic Rep. ................ 307/400 |

OTHER PUBLICATIONS

Sessler et al, "The Electret Microphone", 1964 IEEE International Convention Record.

*Primary Examiner*—Rolf Hille
*Assistant Examiner*—Tan Ho
*Attorney, Agent, or Firm*—Oblon, Spivak, McClelland, Maier & Neustadt

[57] ABSTRACT

The invention relates to the obtaining of a structure generating non-linear electrooptical effects, the effects being due to molecules or inter-molecular groupings possessing a non-linear susceptibility and the orientation of the molecules or groupings being induced by an applied electric field. According to the invention, the orientation of the molecules or inter-molecular groupings (5) is obtained by of a dielectric having a permanent polarisation such as an electret (6).

13 Claims, 6 Drawing Sheets

PROCESS FOR OBTAINING A STRUCTURE GENERATING NON-LINEAR ELECTROOPTICAL EFFECTS, STRUCTURE OBTAINED AND APPLICATIONS THEREOF

BACKGROUND OF THE INVENTION

The present invention relates to a process for obtaining a structure generating non-linear electrooptical effects, i.e. a structure possessing a susceptibility somewhat greater than 1. It also relates to structures obtained from this process and in particular those enabling the generation of a second harmonic of an optical wave incident on such a structure. The invention further relates to possible applications for such structures that can be implemented in the form of planar layers, films or for producing optical guides.

DISCUSSION OF THE BACKGROUND

Since the development of intense light sources provided by lasers, electrooptical effects have been put into application in many fields such as optical telecommunications and optical signal processing. The electrooptical effects are induced in dielectric materials (i.e. bodies that are transparent to an electromagnetic wave) by the application of electric fields. These electric fields can be associated to light beams incident on the dielectric material. The refractive index of the dielectric material then becomes a function of the intensity of the incident light beam(s), so opening the field of non-linear optics (generation of harmonics, frequency transposition, optical memories, etc. . . ).

When an electric field $\vec{E}$ is applied to a dielectric, the electrically charged particles forming the matter of the dielectric (electrons, ionised atoms) find themselves displaced from their equilibrium position by a distance which is a function of: the intensity of the electric field $\vec{E}$, the electrostatic binding forces to which these particles are submitted, and the frequency of the electric field applied to the arrangement of molecules of the dielectric. There results a polarisation of the matter denoted by the vector $\vec{P}$ and which is by definition equal to the product of the density of the displaced charges by the vector representative of that displacement. Between the electric field vector E and the polarisation vector associated to the matter P, there exists a matrix relation in the form:

$$\vec{P} = \|\chi\| \cdot \vec{E}$$

if the applied electric field intensity is not too great. If the medium is isotropic, $\|\chi\|$ reduces to a scalar. In the general case of anisotropic media, $\|\chi\|$ is a tensor.

However, if there is applied an intense electromagnetic field to the dielectric, at an optical frequency, the induced polarisation is no longer proportional to the applied optical field, but contains non-linear terms proportional to the square and cube of the applied fields. The range of effects produced for these non-linear polarisations has been studied in depth since the discovery by FRANKEN of the generation of second harmonics by a quartz crystal submitted to radiation from a ruby laser (P. A. FRANKEN, A. E. HILL, C. W. PETERS, G. WEIMREICH, Phys. Rev. Lett., Vol. 7, 1961, p. 118).

The response of a medium to the application of an electromagnetic field can be described developing the induced polarisation in a complete series of the applied electric field:

$$\vec{P} = \|\chi^{(1)}\| \cdot \vec{E} + \|\chi^{(2)}\| \cdot |E| \vec{E} + \ldots$$

The first term of this development represents the linear polarisation, whereas the $n^{th}$ term reflects the non-linear response of the $n^{th}$ order of the applied field. The coefficients $\chi^{(n)}$ are tensors of order $(n+1)$ referred to as $n^{th}$ order non-linear susceptibility tensors. The different terms contained in $\vec{P}$ decrease very rapidly with the order n, and it was only with the appearance of intense luminous sources such as laser beams that non-linear electrooptical effects corresponding to second order susceptibility could be exploited.

For certain dielectrics and under certain conditions, a polarisation induced by an incident light beam and corresponding to a quantity of stored energy, gives rise to a radiation of a wave oscillating at a frequency double that or the incident luminous beam, which corresponds to the restitution of a part of the stored energy.

One of the conditions necessary for a dielectric to generate, by non-linear effect, a wave representing the second harmonic of an incident light beam, is that its second order susceptibility tensor be non-zero. Tensors $\chi^{(n)}$ being defined from the properties of crystals, it is possible to greatly restrict the number of independent coefficients of the tensors $\chi^{(n)}$ to $3^{(n+1)}$ components by using symmetry properties of the medium. Accordingly $\chi^{(2)}$ shall only be non-zero in non centro-symmetric media. This excludes all amorphous media (glass, classical polymers) which are currently used in thin-film optics.

Presently, the materials most commonly used to obtain the phenomenon of second harmonic generation in non-linear optics are mineral monocrystals such as lithium niobate or potassium dihydrogenophosphate (KDP). However, organic compounds possess in this field a certain number of advantages over mineral salts. Indeed, at frequencies belonging to the optical domain, the non-linear effects to which they give rise are of a purely electronic origin, which leads to a virtually instantaneous response of these materials and qualifies them for applications in the field of ultra-high speed optical signal processing. Moreover, they have a higher optical damage threshold (also designated by the term photorefringence). Finally, they offer an enormous potential in molecular engineering, allowing to obtain materials having greater second-order susceptibilities.

Organic materials having an optical function (frequency doubler, Pockels effect, parametric oscillator, optical mixer) can be obtained with different types of material and by different implementation techniques.

Organic compounds usable for non-linear optics are formed of molecules, or contain molecules, possessing a coefficient of what is termed second order hyperpolarisability (or $\beta$ hyperpolarisability).

The best known way at present to obtain molecules having a very high hyperpolarisability is to synthesize compounds formed of a system of conjugated electrons and presenting a charge asymmetry. But for the compound to give rise to the phenomenon of second harmonic generation, it is further necessary that the molecular arrangement preserves at the macroscopic scale the electronic density that exists at the molecular scale.

There are known organic materials constituted of molecules having a second order hyperpolarisability organised in a three-dimensional manner in the form of organic crystals. For these materials to give satisfaction, it is necessary to obtain non centro-symmetric monocrystals. However, the success rate in obtaining such crystals is only 20% with non-chiral compounds. Indeed, molecules like 4N dimethylamino 4' nitrostilbene (DANS) show a strong permanent dipolar moment and pair together top-against-bottom, which leads to a centro-symmetric system.

There are also known layers formed of amphiphile organic molecules having second order hyperpolarisability, deposited on a substrate by the Langmuir-Blodgett technique. These layers have the drawback of being formed of polycrystals, which causes light diffusion phenomena.

Another type of ordered structure of molecules possessing a very great non-linear response and capable of generating the second harmonic of an electromagnetic wave is formed by polymers. The polymer films are particularly interesting since they can be applied over very large surfaces (relative to the size of the monocrystals) and over substrates of various types. Finally, they can be produced much more rapidly than monocrystals and at low cost.

There are known layers formed of mesomorphic copolymers having differentiated and alternated lateral groupings. The groupings are either of a mesogenic character favouring the establishment of a mesophase, or of a strong second order hyperpolarisability. An electric field applied to these layers orients the mesogenic groupings which impose this orientation to the high second order polarisability groupings. The structure obtained is non centro-symmetric (see FR 2 597 109 filed by the applicant).

There are known layers formed of second order polarisability molecules oriented under an electric field applied in a matrix of mesomorphic polymer with mesogenic lateral grouping favouring the establishment of a mesophase generating the orientation of molecules active in non-linear optics. This constitutes a first way of obtaining doped layers also known as guest-host systems.

There are again known layers formed of molecules active in non-linear optics oriented under electric fields in a matrix of amorphous polymer at a vitreous transition temperature greater than ambient temperature. The orientation of the active molecules occurring at a temperature greater than the vitreous transition temperature, the return to ambient temperature freezes the orientation of the electric dipoles of these molecules. This constitutes a second way of obtaining doped layers.

In the case of layers obtained by the Langmuir-Blodgett technique or in the form of monocrystals, the orientation of the molecular dipoles is inherent to the Langmuir-Blodgett technique or the crystallogenesis and is stable in time.

In the case of polymers active in non-linear optics, there is obtained a non centro-symmetric system by the orientation of corresponding molecular dipoles under the effect of an electric field that is sufficiently intense and whose application time and intensity depend on the temperature at which it is applied. As a general rule, use is made of amorphous materials with a vitreous transition greater than ambient so as to freeze molecular movements at ambient temperature after polarisation.

For example, for an organic layer formed of a matrix of poly (methyl methacrylate) or PMMA containing high polarisability active molecules, the application of an electric field greater than 1 MV/cm at 100° C. for 10 mn with cooling under a field provides a layer of second order susceptibility equal to $70 \times 10^{-12}$ m/V, that is 10 times that of lithium niobate. In fact the value of susceptibility was initially higher but, owing to relaxation phenomena, it decreases by approximately 30% before stabilising after about 72 hours.

SUMMARY OF THE INVENTION

The invention proposes a new method for obtaining a structure generating non-linear electrooptical effects that does not have the above-mentioned drawbacks. The molecules active in non-linear optics are oriented by an applied electric field and which is induced by a permanent polarisation dielectric which can advantageously be an electret.

The invention therefore has object a process for obtaining a structure generating non-linear electrooptical effects, said effects being due to molecules or to intramolecular groupings possessing a non-linear susceptibility, the orientation of said molecules or said groupings being induced by an applied electric field, characterized in that the process consists in obtaining the orientation of said molecules or said groupings by means of a dielectric having a permanent polarisation.

The invention has also for object a structure generating non-linear electrooptical effects, the structure comprising molecules or intramolecular groupings possessing a non-linear susceptibility, characterized in that the structure also contains a dielectric having a permanent polarisation, said molecules or said intramolecular groupings being submitted to the action of an electric field developed by the dielectric having a permanent polarisation.

BRIEF DESCRIPTION OF THE DRAWINGS

The invention shall be better understood and other advantages shall appear upon reading the description that follows, given as a non-limiting example, and through the appended drawings in which.

DESCRIPTION OF THE PREFERRED EMBODIMENTS

Figure 1:
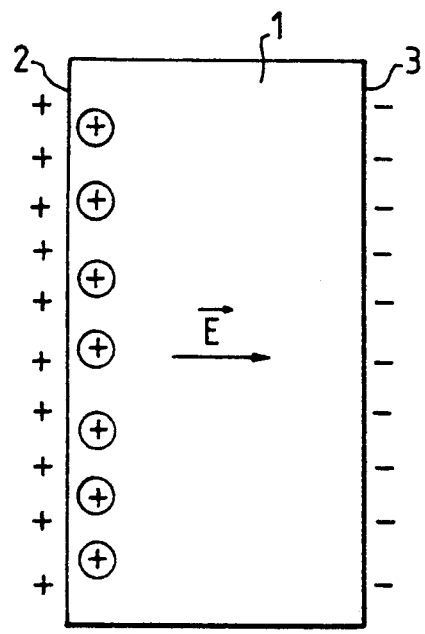
FIG. 1 is illustrative of an excess charge electret.

According to the invention, the structure generating non-linear electrooptical effects is a bi-functional structure having one or two layers. It can comprise a layer having an optical function comprising molecules or intramolecular groupings active in non-linear optics, these molecules or these groupings being oriented by the application of an electric field. In particular, for the generation of second harmonics, these molecules or intramolecular groupings shall have a high $\beta$ hyperpolarisability. The structure can equally comprise a dielectric layer having a permanent polarisation generating an electric field orienting the above-mentioned molecules or intramolecular groupings.

The structure according to the invention can equally comprise only one layer that ensures both functions together: optical and electric.

The dielectric having a permanent polarisation can advantageously be constituted by an electret. If one refers to the article "Electrets" by F. MICHERON published "Techniques de l'Ingenieur, E 1893, December 1987": "an electret is a dielectric that carries a virtually permanent polarisation, that is to say whose decay time is greater than its period of use. This definition differentiates electrets from dielectrics having a strictly permanent polarisation, such as pyroelectrics (for example tourmaline), ferroelectrics (e.g. barium titanate) and polar piezoelectrics (e.g. lithium niobate). The boundary between virtually permanent polarisation dielectrics and those having a strictly permanent polarisation can be defined according to several criteria: for the first, the polarisation is always induced artificially, whereas for the second it is spontaneous. The electric state of the first is a metastable state, whereas for the second it is strictly stable. Finally, electrets are formed in disordered materials (polymers and amorphous minerals) whereas spontaneous polarisation is always a consequence of polar crystalline structure".

For reasons that stem from the application of the structures according to the invention, it is advantageous to implement electrets from polymers. Indeed, the latter make it easy to obtain thin films or films deposited on a substrate.

Among the different polymers susceptible of being polarised, there can be cited:

polytetrafluoroethylene (PTFE) or teflon (according to the registered trade mark of Du Pont de Nemours).

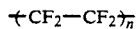

poly (tetrafluoroethylene-hexafluoropropylene) or teflon FEP

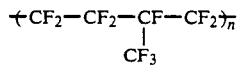

poly (tetrafluoroethylene-perfluoromethoxylene) or teflon FPA

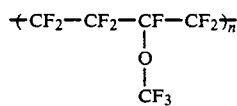

polypropylene (PP)

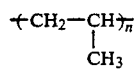

These polymers give very interesting electrets owing to their exceptional stability that can be maintained for almost a century at ambient temperature. Moreover, these polymer electrets can be fabricated continuously using industrial processes by charge implantation.

Corona discharge is an industrial process of charge implantation. The polarisation of the polymer comes from an excess of charges trapped very close under one of the faces of the electret. To implement the corona discharge, a block or film of polymer to be polarised is put into contact by one of its faces with an electrode. A point, brought to a high voltage of several kilovolts with respect to the electrode, is placed at a few millimeters above the face of the polymer opposite to the face in contact with the electrode. Ionic species are transported in the thus-created electric field. They are deposited on the surface and some of these charged species transfer their charge to traps located beneath the surface where they lose all mobility. It is the latter charges that provide the polymer with a virtually permanent polarisation, whereas the surface charges can flow by surface conductivity.

Charge implantation can again be obtained by other means known to the skilled person, for example by using an ion beam of sufficient energy.

FIG. 1 illustrates schematically the distribution of charges obtained in an electret with excess charge. The block or film 1 constituting the electret presents two main faces 2 and 3. By the above-described process, there are trapped very close beneath the face 2 positive charges which are shown encircled in FIG. 1. The + signs represent positive surface charges and the − signs negative surface charges. Together these charges induce an electric field $\vec{E}$ in the dielectric 1.

According to the invention, there can thus be obtained a structure generating non-linear electrooptical effects, these effects being due to molecules or intramolecular groupings possessing a non-linear susceptibility, by orienting these molecules or groupings by means of an electric field coming a permanently polarised dielectric such as an electret.

The molecules or intramolecular groupings possessing a non-linear susceptibility must be able to be influenced by the orienting electric field. The best solutions therefore consist in disposing of either a double-layer structure, each layer having a well-defined function, optical or electrical, or a single layer in which the dielectric ensures both functions.

The examples that follow, given in a non-limiting way, shall illustrate some aspects of the invention.

EXAMPLE 1

Double-layer Structure

Figure 2:
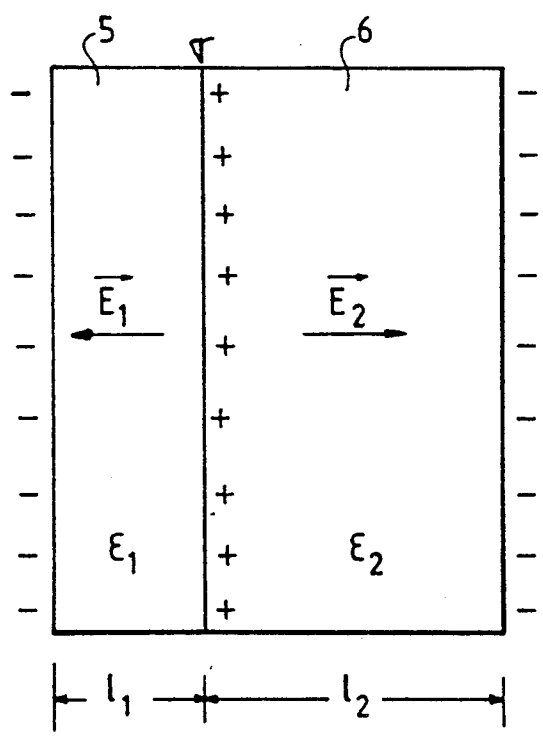
FIGS. 2 and 3 depict double-layer structures according to the invention.

This double-layer structure is depicted in FIG. 2. A dielectric layer 5 active in non-linear optics is superposed on a layer 6 forming an electret of the type depicted in FIG. 1. The index of refraction of the electret must be adapted to that of the layer 5, i.e. it must a refractive index less than that of the layer 5. The electret is obtained, for example, by implantation of positive charges as in the case of FIG. 1. In the case of a PTFE of 10 to 30 μ thickness, these charges can be implanted at approximately 1 μ from the surface. This implantation can be considered as permanent since the conductivity of this dielectric is virtually zero $(10^{-18} \Omega^{-1} \times m^{-1})$.

The face of the dielectric carrying these charges is that which is in contact with the active layer 5. The charges very close to the surface can be considered as trapped in surface and generate an electric field in the layer active in non-linear optics.

In FIG. 2, to simplify the diagram, the trapped positive charges and the surface positive charges are represented identically by the + sign.

The "optical" layer 5 has a thickness $l_1$ and a dielectric constant $\epsilon_1$. The "electric" layer 6 has a thickness $l_2$ and a dielectric constant $\epsilon_2$. Let $\tau$ be the density of charges disposed very close to the beneath the surface of the electret. This charge density generates electric fields $E_1$ and $\vec{E}_2$ respectively in the optical 5 and in the electric layer 6.

$$E_1 = \frac{\sigma \times l_2}{l_1 \times \epsilon_2 + l_2 \times \epsilon_1}$$

$$E_2 = \frac{-\sigma \times l_1}{l_1 \times \epsilon_2 + l_2 \times \epsilon_1}$$

The conditions for which these formulas hold are explained in the article by F. MICHERON entitled "Properties and applications of polarised dielectrics: electrets, oriented polymers and ferroelectrics" published in Revue Technique de THOMSON-CSF, volume 10, n⁰ 3, p. 457, September 1978.

If $l_1 = 2\mu$, $l_2 = 10\mu$, $\epsilon_1 = 5$, $\epsilon_2 = 3$, $\tau = 10^{-5}$ to $10^{-6}$ C/m$^2$, the corresponding electric field $E_1$ is $10^5$ to $10^6$ V/cm. The value of this electric field is sufficient to orient and maintain oriented the active molecules of the optical layer.

The optical layer 5 can be, and that is another advantage of the invention, of various types. For example, the layer 5 can be formed of mesomorphic copolymers of differentiated and alternated groupings, the groupings being either of a mesogenic character, or active in non-linear optics. The placing into contact of layers 5 and 6 then has the effect of orienting the mesogenic groups owing to the electric field developed by the electret. The mesogenic groups then impose in turn this orientation to the groupings active in non-linear optics.

If layer 5 constitutes a guest-host system in which the molecules active in non-linear optics are disseminated in a mesomorphic polymer having mesogenic lateral groupings, there again, the placing into contact of layers 5 and 6 would provoke the orientation of groupings active in non-linear optics.

If layer 5 constitutes a guest-host system in which the molecules active in non-linear optics are disseminated in an amorphous polymer matrix, the placing into contact of layers 5 and 6 shall occur at a temperature greater than the vitreous transition temperature of the amorphous polymer to allow the orientation under the field of the molecules active in non-linear optics.

The electric field existing permanently in the optical layer owing to the proximity of the electret makes it possible to align permanently the molecules active in non-linear optics, parallel to field lines and thus to avoid a decrease in susceptibility as a function of time.

EXAMPLE 2

Figure 3:
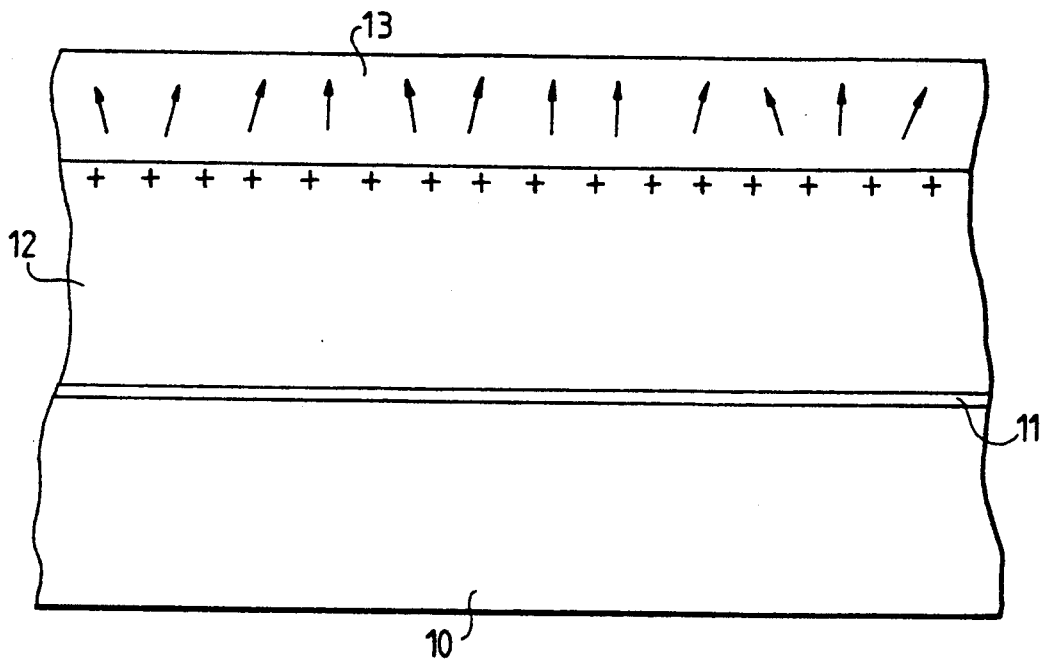

This example relates to a double-layer structure deposited over a glass substrate overlain by an electrode made of a mixed oxide of tin and indium (ITO electrode). There is deposited, as shown in FIG. 3, on the substrate 10, from the side having the electrode 11, a solution containing polypropylene so as to obtain after drying and evaporation of the solvent a layer 12 having a thickness of around 10 microns. The deposition can be carried by the so-called "spinner" method. The solvent used can be chlorobenzene or trimethylbenzene. The thus-obtained layer 12 then receives an implantation of charges by corona effect which makes it possible to trap a certain number of surface charges. This operation is conducted at high temperature (greater than 80° C.) in order to populate the deep traps. Electrode 11 then serves as a contact electrode with the dielectric to be polarised. The voltage necessary for implementing the corona discharge is applied between electrode 11 and a point that is displaced above the surface to trap. In this example, there is injected positive ions, as indicated by the + signs depicted in FIG. 3.

Once the electret, constituted by layer 12 is produced, there is deposited on that layer another solution to obtain the optical layer. This solution can also be deposited by the so-called spinner method. It contains, for example, a polymethylmethacrylate type polymer with molecules having $\beta$ hyperpolarisability, of the azoic type comprising donor and acceptor groupings at the extremities. Such molecules are known to the skilled person. The solvent of the solution can be methylisobutylcetone or methylethylcetone.

In order to evaporate and dry the film, the structure is brought to a high temperature (greater than 60° C.) for one hour in a vacuum.

If the solution used for depositing the second layer is sufficiently resistive, the electric field radiated by the electret is sufficient to orient the molecules active in non-linear optics during the evaporation of the solvent.

If the solution is not sufficiently resistive, charges of sign opposite to the trapped charges will come to screen the radiated electric field and, consequently, no orientation will be possible. In that case, it is necessary to deposit on the optical layer 13, after drying and evaporation of the solvent, an electrode (for example of aluminum or gold) and to polarise the composite structure by the application of an electric field, taking into account the direction of the electric field radiated by the electret. It is then sufficient to eliminate this electrode to obtain the final structure. The elimination of this electrode can be achieved by methods well known to the skilled person.

The electric field radiated by the electret will maintain aligned the dipoles of the optical layer in a permanent manner over a range of temperatures defined by the stability of the electret and which, as a general rule, depends on the polarisation temperature (greater than 80° C.). In FIG. 3, there is shown succinctly a few of these dipoles, whose general direction is well perpendicular to the deposited layers.

The thickness of the thus-obtained optical layer can be on the order of several microns.

EXAMPLE 3

Single-layer Structure

In this case, the dielectric layer ensures both optical and electrical functions.

In an application for the generation of the second harmonic, the layer contains molecules or intramolecular groupings having $\beta$ hyperpolarisability oriented in parallel and is electrically charged by implantation of charges.

Figure 4:
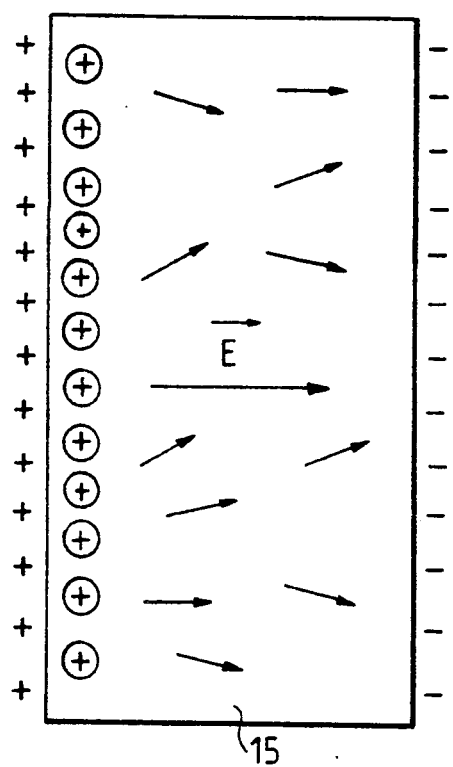
FIGS. 4 and 5 depict single-layer structures according the invention.

FIG. 4 shows schematically a bi-functional layer 15 by adopting for the electrical charges the representation adopted for FIG. 1. There has generally been succinctly depicted a few of the dipoles of the molecules having a high $\beta$ hyperpolarisability.

There can be used as optically active molecules those described in example 2. These molecules can be contained in a material such as poly (methyl methycrylate) PMMA or poly (methyl acrylate) PMA.

The optically active molecules or intermolecular groupings are spontaneously oriented under the influence of the implanted charges. This orientation occurs all the better if carried out at a temperature greater than ambient temperature, for example 60° C.

EXAMPLE 4

Figure 5:
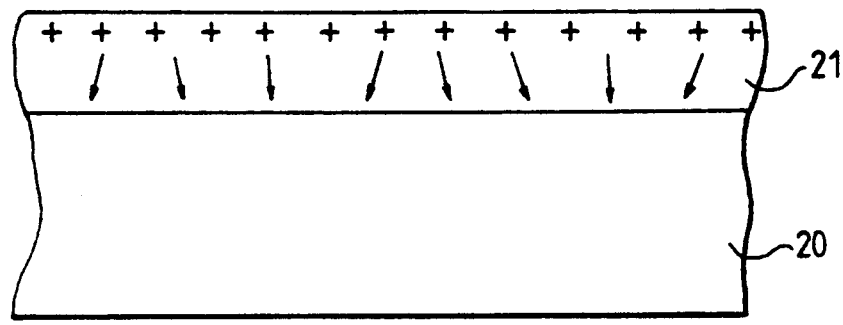

This example relates to a single-layer structure disposed on a substrate. FIG. 5 depicts such an disposition. The substrate 20 possesses an optical index of refraction less than that of the layer 21 deposited above and which must ensure the double optical and electrical function. The layer 21 is deposited for example by the so-called spinner method, followed by evaporation and drying. It contains molecules or intramolecular groupings having a high $\beta$ hyperpolarisability. Charges, for example positive, are injected in one side of the layer 21 that is opposite to the substrate 20. If the substrate 20 is not conductive, it will be necessary, as in example 2, to provide an electrode between the substrate and the layer 21. If the density of trapped surface charges is sufficient, the electric field induced by these charges will orient the molecules or intramolecular groupings having a high $\beta$ hyperpolarisability, and will maintain them permanently aligned. Materials that can be used are those of example 3.

EXAMPLE 5

This example relates to a double-layer structure with optical guide. The structure described in this example is the same as that of example 2. The essential difference between the two examples is constituted by the use of a negative photoresist polymer.

Figure 6:
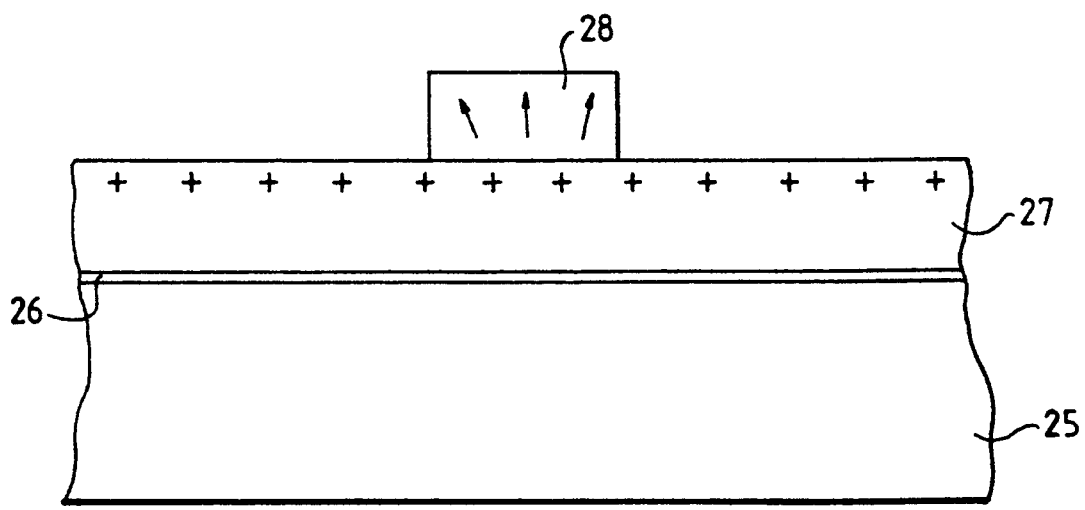
FIG. 6 depicts a double-layer structure with optical guide according to the invention.

FIG. 6 depicts such a double-layer structure with optical guide. A glass substrate 25 supports an ITO electrode 26 itself covered by the electret 27 which supports the optically active layer 28. The arrangement of this structure can be obtained in the same way as in the case of example 2. Instead of being a uniform layer, layer 28 forms an optical waveguide. To obtain this optical waveguide, there is first deposited on the electret 27 a uniform optical layer as in the case of FIG. 3. This optical layer is a polymer of the negative photoresist type (cross-linkable under radiation) in order to only obtain the part irradiated during masking under the effect of ultra-violet radiation, an electron beam or x-rays and after development by a solvent. The orientation of the optically active molecules or intramolecular groupings should be carried out prior to irradiation. For the optical waveguide to carry out its function, layer 27 serving as the electret should have a refractive index less than the refractive index of the waveguide 28.

EXAMPLE 6

This example relates to a single-layer structure with optical guide, the term single-layer still being reserved to the fact that a same layer ensures both the optical and electrical functions.

Figure 7:
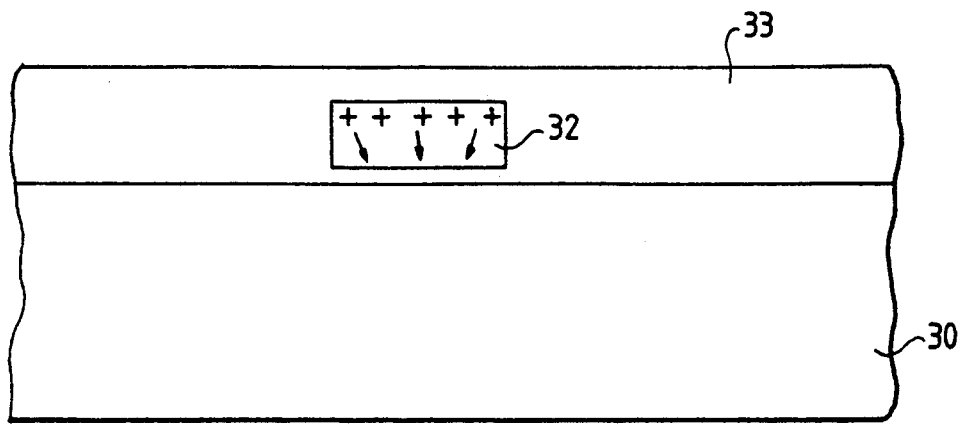
FIG. 7 depicts a single-layer structure with optical guide according to the invention.

To elaborate such a structure, the starting point can be, as shown in FIG. 7, a glass substrate 30 on which is deposited first an insulating thin-film, then a bi-functional layer of negative photoresist type polymer and destined to ensure both the optical and electrical functions. After irradiation and development of the photoresist polymer to obtain the shape of a waveguide 32, there is carried out the electret function of the guide, for example by implantation by means of an ion beam. A protective insulation layer 33 is then deposited until covering of the waveguide 32 which thus becomes buried. Layer 33 possesses a retractive index less than that of guide 32. By reference 33, there has been designated in fact two layers which are deposited in two separate stages, but which can be of a same material, for example polyfluorine vinylidene.

By providing means for applying an external electric field (an electrode on the substrate 30 and another on the layer 33), there is obtained an electro-optical modulator.

EXAMPLE 7

Figure 8:
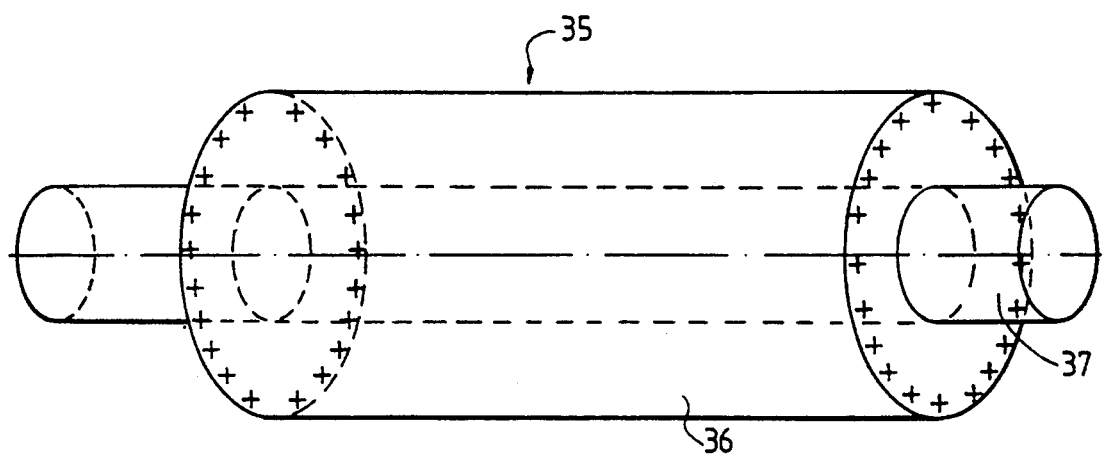
FIGS. 8 and 9 depict double-layer type cylindrical structures according to the invention.

This example relates to a structure belonging to the double-layer type, but in which the components are cylindrical as shown in FIG. 8. A sleeve 35 is obtained by an axial perforation of a cylinder of revolution made of dielectric material. From this sleeve there can be produced an electret by implantation of charges on the external tubular surface 36. The implantation of charges can be achieved by placing the sleeve 35 under a beam of ions and causing it to rotate about its axis. These charges are positive in the case shown in FIG. 8, but can be of course negative. The sleeve 35 in that case radiates in a radial electric field, having cylindrical symmetry.

An optical fiber 37, made of a material containing intramolecular groupings active in non-linear optics, is introduced inside the sleeve 35. Under the effect of an electric field radiated by the sleeve and of the imposed temperature (greater than 60° C.), the optically active molecules or intramolecular groupings of the fiber orient themselves radially in remain frozen in that orientation in a permanent manner. The optical refractive index of the sleeve 35 is lower than that of the fiber 37.

EXAMPLE 8

Figure 9:
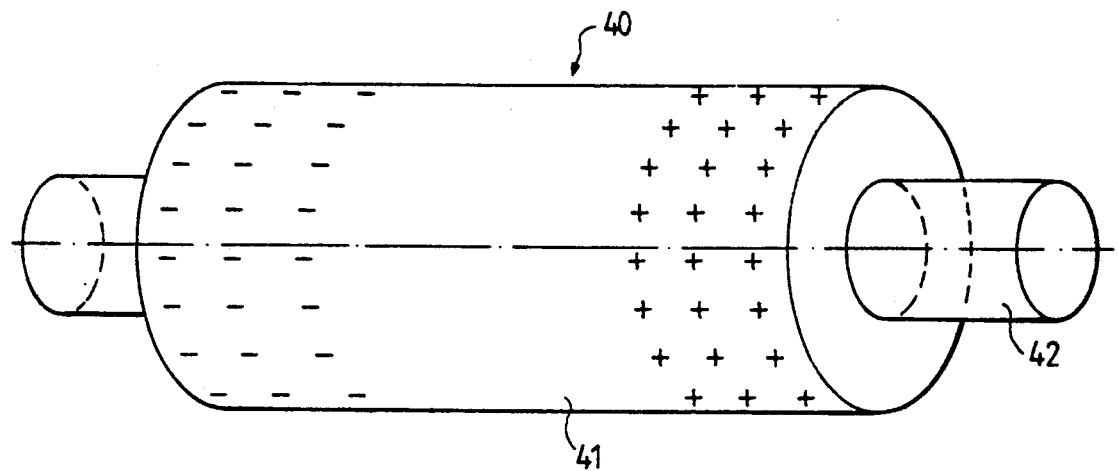

This example relates to a structure analogous to that of example 7, but differing therefrom by the nature and distribution of the implanted charges. FIG. 9 illustrates such a structure. There can be found in that figure the sleeve 40 and the fiber 42 as shown previously. The difference resides in the fact that the charges implanted at the external tubular structure are negative at one end of the sleeve and positive at the other end. The resulting polarisation is consequently parallel to the axis of the fiber.

EXAMPLE 9

Figure 10:
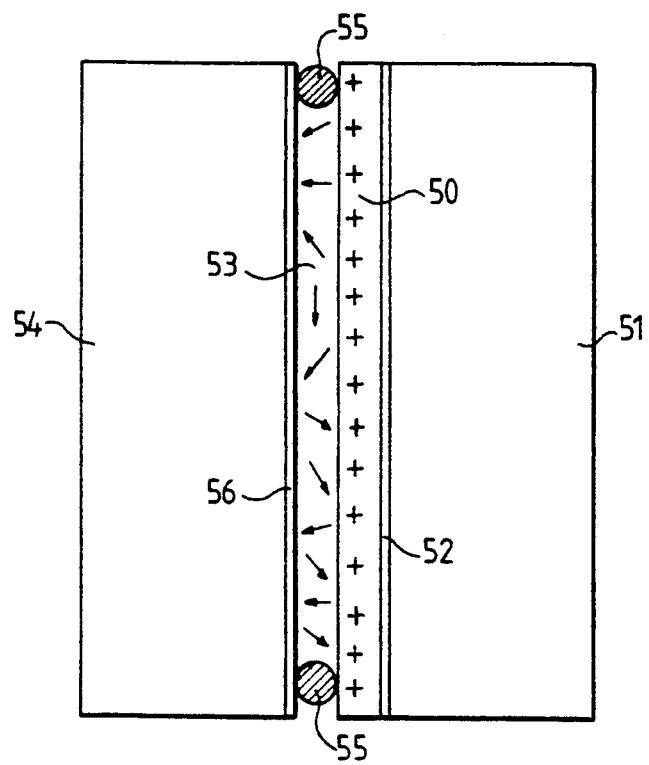
FIG. 10 depicts a double-layer having an optical liquid layer, according to the invention.

This example relates to the double-layer structure depicted in FIG. 10. Using one of the methods already described, a polarised electret film 50 is deposited on the face of a substrate 51 which is covered by an electrode 52. The substrate 51 can be a glass and the electrode a mixed alloy of tin and indium (ITO). A liquid layer 53 containing non-oriented hyperpolarisable molecules is deposited between the electret film 50 and a glass platelet 54. Sealing is ensured by joints 55, for example made of epoxy.

If the resistive layer 53 is sufficiently resistive, the optically active molecules or intramolecular groupings orient themselves under the effect of the electric field induced by the electret 50.

If the liquid layer 53 is not sufficiently resistive, there must be associated to the structure an electrical control element. In this case, the internal face of the platelet is 54 is covered with an ITO electrode 56. To provoke the orientation of the optically active molecules or intramolecular groupings of the liquid layer 53, there must be applied, between the electrodes 52 and 56, a dc pulse developing an electric field in the direction opposite to that developed by the electret. Once the optically active molecules or intramolecular groupings are correctly oriented, the electric field developed by the electret will maintain this disposition over a time period that will depend on the more or less great resistivity of the liquid layer 53. It will be necessary to periodically re-orient the optically active molecules by means of a voltage pulse.

EXAMPLE 10

Figure 11:
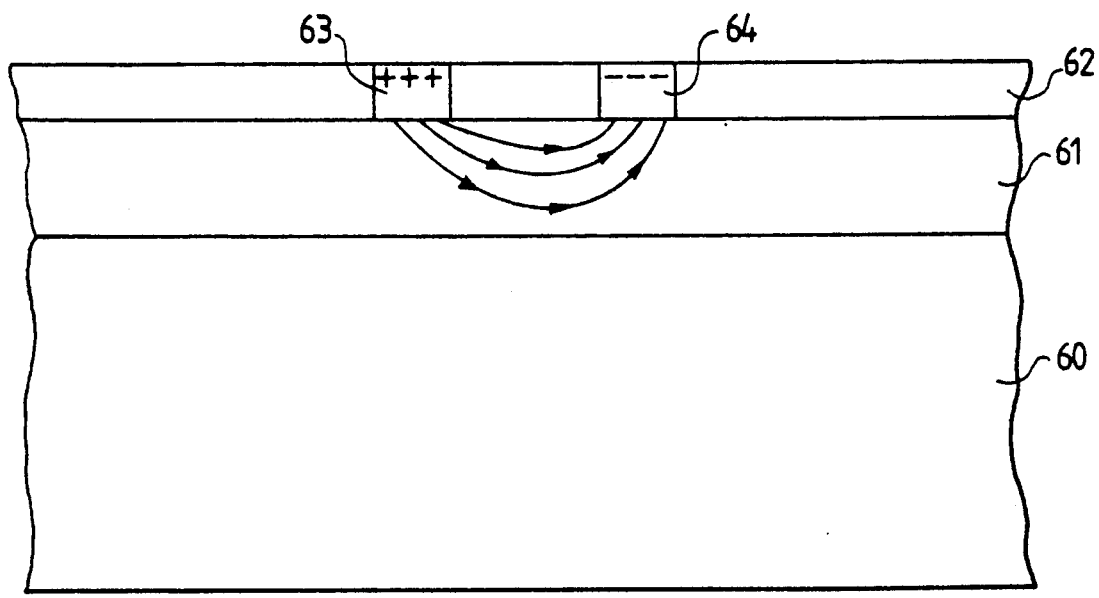
FIG. 11 depicts a double-layer structure with optical waveguiding by variation of index, according to the invention.

The structure depicted in FIG. 11 is of the double-layer type. On a substrate 60 (made of glass, silicon, gallium arsenide, etc.), there is deposited an optical layer 61 comprising molecules or intramolecular groupings active in non-linear optics. The deposition of the optical layer 61 can be achieved from a solution, as described above. A layer 62 of dielectric material is then deposited on the optical layer 61. In the dielectric layer 62, there is formed, by ion implantation by means of an ion beam, two zones 63, 64 having the role of electrets. The zones 63 and 64 are implanted with charges of opposite sign. There can thus be obtained a guided structure in layer 61 solely by variation of the optical index. The field lines radiating from the layer 61, and joining zones 63 and 64, orient the optically active molecules. As already mentioned, a high temperature (around 60° C.) facilitates the orientation of the molecules during the ion implantation. There is thus induced a permanent variation in the refractive index delta n since the applied electric field is permanent. With this type of structure, the injection of an optical wave can be carried out from the edge.

An improvement in the structure shown in FIG. 11 consists in modulating the electric field induced by the electrets by superposing another electric field thereon. Indeed, it is possible, during the elaboration of the structure, to deposit electrodes connected to a voltage generator (for example, one electrode on the substrate 60 and the other on the optical layer 61, in the region located between the two electrets) so as to frame the optical guide. The modulating electric field can be dc or ac. Another solution would consist in depositing electrodes on zones 63 and 64 with interposition of a protective layer.

We claim:

1. A process for obtaining a structure generating non-linear electrooptical effects, comprising the steps of:
   providing a dielectric having a permanent polarisation with a resultant electric field;
   providing, proximal to said dielectric, a material having molecules or groups of intramolecular groupings possessing a non-linear susceptibility;
   orienting said molecules or said groups of intramolecular groupings as a result of said electric field in said dielectric.

2. A structure for generating non-linear electrooptical effects, said structure comprising:
   a dielectric having a permanent polarisation, said polarisation developing an electric field;
   a material, proximate to said dielectric, said material having molecules or intramolecular groupings possessing a non-linear susceptibility with said molecules or said intramolecular groupings being submitted to said electric field in order to orient said molecules or said groupings.

3. A structure according to claim 2, characterized in that the dielectric having a permanent polarisation is an electret.

4. A structure according to one of claims 2 or 3, characterized in that said molecules or said intramolecular groupings are comprised in a layer termed optical layer (13) which is superimposed on the dielectric having a permanent polarisation (12).

5. A structure according to claim 4, characterized in that said optical layer produced in the form of a waveguide (28).

6. A structure according to claim 5, characterized in that said optical layer has the form of a fiber (37), the dielectric having a permanent polarisation having the form of a sleeve (35) enveloping the fiber.

7. A structure according to claim 6, characterized in that the polarisation of the dielectric having a permanent polarisation (35) is such that the electric field induced in the fiber (37) is radial.

8. A structure according to claim 6, characterized in that the polarisation of the dielectric having a permanent polarisation (41) is such that the electric field induced in said fiber is axial.

9. A structure according to claim 4, characterized in that said optical layer is liquid.

10. A structure according to claim 4, characterized in that the dielectric having a permanent polarisation is formed of two zones (63, 64) whose electrical charges are of opposite sign, these zones inducing in the optical layer a localised electric field.

11. A structure according to one of claims 2 or 3, characterized in that said molecules or said intramolecular groupings are included in the dielectric having a permanent polarisation (15).

12. A structure according to claim 11, characterized in that said dielectric having a permanent polarisation including said molecules or said intramolecular groupings has the form of a waveguide (32).

13. A structure according to any one of claims 2 or 3, characterized in that it further comprises means (52, 56) for applying an external electric field.

* * * * *